(12) United States Patent
Carrasco Brioso et al.

(10) Patent No.: US 10,088,099 B2
(45) Date of Patent: Oct. 2, 2018

(54) VIDEO CAMERA SUPPORTING DEVICE

(71) Applicant: Pablo Manuel Carrasco Brioso, San Juan de Aznalfarache (Sevilla) (ES)

(72) Inventors: Pablo Manuel Carrasco Brioso, San Juan de Aznalfarache (ES); Olivier José Montes Cantos, San Juan de Aznalfarache (ES)

(73) Assignee: Pablo Manuel Carrasco Brioso, San Juan de Aznalfarache, Sevilla (ES)

( * ) Notice: Subject to any disclaimer, the term of this patent is extended or adjusted under 35 U.S.C. 154(b) by 0 days.

(21) Appl. No.: 15/547,447

(22) PCT Filed: Feb. 9, 2016

(86) PCT No.: PCT/ES2016/070076
§ 371 (c)(1),
(2) Date: Jul. 28, 2017

(87) PCT Pub. No.: WO2016/128603
PCT Pub. Date: Aug. 18, 2016

(65) Prior Publication Data
US 2018/0023761 A1    Jan. 25, 2018

(30) Foreign Application Priority Data
Feb. 10, 2015    (ES) ............... 201530143 U

(51) Int. Cl.
*F16M 13/04*    (2006.01)
*F16M 11/04*    (2006.01)
(Continued)

(52) U.S. Cl.
CPC .............. *F16M 13/04* (2013.01); *A45F 3/14* (2013.01); *F16M 11/041* (2013.01);
(Continued)

(58) Field of Classification Search
None
See application file for complete search history.

(56) References Cited

U.S. PATENT DOCUMENTS

| 2,313,593 A | 3/1943 | Smith |
| 4,687,309 A | 8/1987 | Breslau |
| 7,191,923 B1 | 3/2007 | Kundig |

OTHER PUBLICATIONS

International Search Report dated Jun. 15, 2016, International Application No. PCT/ES2016/070076.

*Primary Examiner* — Clayton E Laballe
*Assistant Examiner* — Linda B Smith
(74) *Attorney, Agent, or Firm* — Womble Dickinson Bond (US) LLP

(57) ABSTRACT

It is formed by a harness worn by an operator (1) and other elements that make it possible to transfer the weight of the video camera between the operator's two shoulders, thereby partially lifting the weight off the shoulder bearing the video camera. The harness (1) is formed by an elastic band (2) destined for being mounted around the camera operator's torso and back and a receptacle sheath (3) that extends from the elastic band (2), in addition to incorporating a supporting foot (4) having a lower end destined for being housed in the receptacle sheath (3) and another upper end, and a coupling mechanism (5) associated with the upper end of the supporting foot (4) destined for coupling the video camera (6) that transfers part of its weight through the supporting foot (4) to the receptacle sheath (3) and, in turn, to the elastic band (2).

8 Claims, 6 Drawing Sheets

(51) Int. Cl.
*F16M 11/06* (2006.01)
*G03B 17/56* (2006.01)
*A45F 3/14* (2006.01)
*A45F 3/00* (2006.01)

(52) U.S. Cl.
CPC ........... *F16M 11/06* (2013.01); *G03B 17/561* (2013.01); *A45F 2003/003* (2013.01); *A45F 2003/142* (2013.01)

VIDEO CAMERA SUPPORTING DEVICE

CROSS-REFERENCE TO RELATED APPLICATIONS

The present patent application is a national phase application of International Application No. PCT/ES2016/070076, filed Feb. 9, 2016, which claims priority to Spanish Application No. U 201530143, filed Feb. 10, 2015, the disclosures of which are incorporated herein by reference.

OBJECT OF THE INVENTION

The present invention relates to a video camera support device intended for facilitating the distribution of the weight of the camera on the user's two shoulders, in order for the camera operator to comfortably record images while reducing his or her tiredness, minimising injuries and obtaining higher image quality.

The device is of the type that incorporates a harness that is worn by the operator and other accessory elements that make it possible to transfer the weight of the video camera with which the operator normally works carried on one shoulder to the harness, such that the harness distributes the weight of the video camera towards the other shoulder, thereby partially lifting the weight off the shoulder bearing the video camera.

BACKGROUND OF THE INVENTION

Work styles inherited from the film industry have evolved in accordance with the needs imposed by the different ways of communicating with a constantly changing society. Thus, content update has accelerated, developing towards real-time information and converting a camera operator into a practically autonomous technician qualified to carry out his or her informative or reporting activity anywhere in the world with his or her work equipment.

In fact, during the 70 s zoom optics were implemented and smaller magnetoscopes were developed which made field reporting possible and gave rise to Electronic News Gathering or ENG.

Despite the advances in technology, this equipment was most often heavy, uncomfortable and even hazardous, forcing the operator to produce lower-quality work and even causing muscle aches and pains that develop into occupational diseases.

In this type of electronic reporting or ENG it is more complex to bear the weight of a video camera on a single shoulder for long periods of time, generating a situation of fatigue among these professionals, who are often forced to stop shooting when their muscle aches and pains worsen, producing lower-quality recordings. In all cases, these situations develop into occupational diseases.

The weight of the cameras range from 7 kg to more than 11 kg, depending on the technology used, due to which, from the viewpoint of ergonomics, using the camera in static and/or forced postures is a problematic and characteristic factor of graphic reporters.

The most common working posture of a reporter is standing up with the camera resting on his or her shoulder. On many occasions, reporters are forced to spend seemingly endless periods of time waiting with the camera on their shoulder ready to shoot and react in seconds. This implies that graphic reporters are at risk of suffering lumbar and back injuries due to bearing the weight of the camera on a single shoulder, together with flexion, hyperextension, rotation and lateralisation of the trunk, postures which are often combined.

Document U.S. Pat. No. 6,764,231 discloses a camera support destined for mounting on the operator's body, which is formed by a harness which is fitted on the shoulders and has an elongated member or strip that extends inferiorly and on which an articulation is mounted wherefrom an adjustably tilting telescopic and superiorly oriented column extends, having fixing means at its upper end for fixing the position of the camera. This support makes it possible to free the hands to handle the camera and is specially intended for use with photographic cameras, although its use with professional or very large video cameras is not feasible.

DESCRIPTION OF THE INVENTION

The video camera support device proposed by the present invention satisfactorily solves the problems expounded by virtue of its particular configuration, which facilitates the even distribution of the weight of the camera on both shoulders, reducing tiredness, aches and pains, and minimising risk of injury.

The device basically includes a harness formed by: a single elastic band having an adequate configuration for mounting around a camera operator's body disposed crossed over the shoulders and waist, and a receptacle sheath that extends from one sector of the band; and a supporting foot having an end destined for being housed in the receptacle sheath and another end which is associated with a coupling mechanism having an interlocking element destined for anchoring the video camera.

The video camera rests on one of the operator's shoulders and on the supporting foot, which is coupled to the camera and extends inferiorly, said supporting foot resting, in turn, on the receptacle sheath. Since the band is elastic, the weight of the camera, which is transferred to the supporting foot and from here to the receptacle sheath, causes tension and elongation of the elastic band associated with the receptacle sheath, and the transfer of part of the weight of the camera through the elastic band to the other shoulder of the operator holding the camera, thereby enabling the distribution of the weight of the camera on the operator's two shoulders.

Therefore, the device enables the distribution of the weight of the camera on both shoulders, which is highly effective at ergonomic level, since it guarantees improved balance in the operator.

This device also enables operation of the camera with a smooth and stable movement, making it possible to work for a longer period of time without so much physical wear and to shoot better shots, due to the fact that the use of the arms is destined solely for handling the camera controls and not for bearing its weight. Likewise, it minimises the risk of suffering injuries in shoulders, arms and forearms, and lumbar and back injuries, lengthening the operator's professional life.

The distribution of weights achieved by this device makes it possible to position the body in a straight and balanced manner, even when shooting extreme low-angle or high-angle shots, improving the quality of the shots. The greater stability of the camera provided by this device enables the operator to use his or her hands in a tension-free manner and, therefore, with greater freedom of movement and ability to access the switches and buttons of the camera and optical controls while maintaining a straight and balanced body posture.

It has been envisaged that the coupling mechanism will have guides or housing destined for receiving the camera's support surface, which is secured to the coupling mechanism by means of the aforementioned interlocking element, which will preferably be of the quick-connect type.

Preferably, it is envisaged that the coupling mechanism will be joined to the end of the supporting foot with the intermediation of a first articulation, such that the coupling mechanism and the camera coupled thereto may swivel around said first articulation with respect to the supporting foot. Additionally, the possibility of including a fixation element which makes it possible to fix the position of the coupling mechanism and, therefore, of the camera with respect to the supporting foot, establishing a fixed camera position, ideal for shooting static shots or freeing the position of the camera so that the operator can move or tilt it at will, is also envisaged.

The device is of general use for all types of shots taken with the camera on the shoulder and the operator's movements during his or her displacement while shooting and the vibration itself are gently transferred to the camera, as they are absorbed by the elastic band, thereby achieving greater stability of the image being shot, both in stable and fluid shots, panoramic shots and zoom and static shots, thereby improving the quality of the images.

Likewise, this device envisages the possibility of freeing the camera from the operator's shoulder, for example to orient the camera towards the ground and shoot high-angle shots, with the possibility of fixing the position during the shot, in which case the camera would transfer its weight through the supporting foot and from the sheath to the elastic band that rests on the other shoulder.

The device, as described, can be simply and quickly assembled or disassembled, as the operator only has to place the harness crossed across his or her body, orienting the receptacle sheath downwards, extending it downwards to position the supporting foot with the camera, wherein said camera will have previously or subsequently been coupled to the coupling mechanism by the operator.

Both the harness and the supporting foot may be conveniently transported, occupying little space. The possibility that the supporting foot may be telescopic has been envisaged, which would make it possible, on the one hand, to reduce its size for transport and, on the other, to adapt its size in its operational situation in accordance with the user's physique and height.

Additionally, it is envisaged that the elastic band will be adjustable in its extension to adapt to the user's complexion, performing this operation occasionally, for example the first time the user uses the device.

Likewise, it should be noted that, preferably, the receptacle sheath will be articulated with respect to the elastic band, allowing the angle formed by the receptacle sheath with respect to the elastic band to vary in accordance with the different forces applied to the elastic band, thereby facilitating the proper distribution of working forces on the elastic band, as well as the proper positioning of the sheath on the torso of the operator using the harness.

Furthermore, it has been envisaged that the device, optionally and complementarily, will have a padded reinforcement that gives way to the elastic band and which is destined for being constituted in the device support section on the shoulder. The reinforcement shows a curved and ergonomic configuration with smooth, rounded shapes that protect the shoulder and neck from unwanted grazing and distributes the load of the elastic band over a larger contact surface of the body.

In short, this device makes it possible to transfer and distribute the weight of the video camera on the operator, reducing tiredness, fatigue and injuries, and making it possible to lengthen the time during which the operator is obtaining higher-quality images, which ultimately results in greater productivity.

DESCRIPTION OF THE DRAWINGS

In order to complement the description being made and with the object of helping to better understand the characteristics of the invention, in accordance with a preferred embodiment thereof, said description is accompanied, as an integral part thereof, by a set of drawings where, in an illustrative and non-limiting manner, the following has been represented.

PREFERRED EMBODIMENT OF THE INVENTION

In light of the figures, following is a description of a preferred embodiment of the video camera support device that constitutes the object of this invention.

Figure 1:
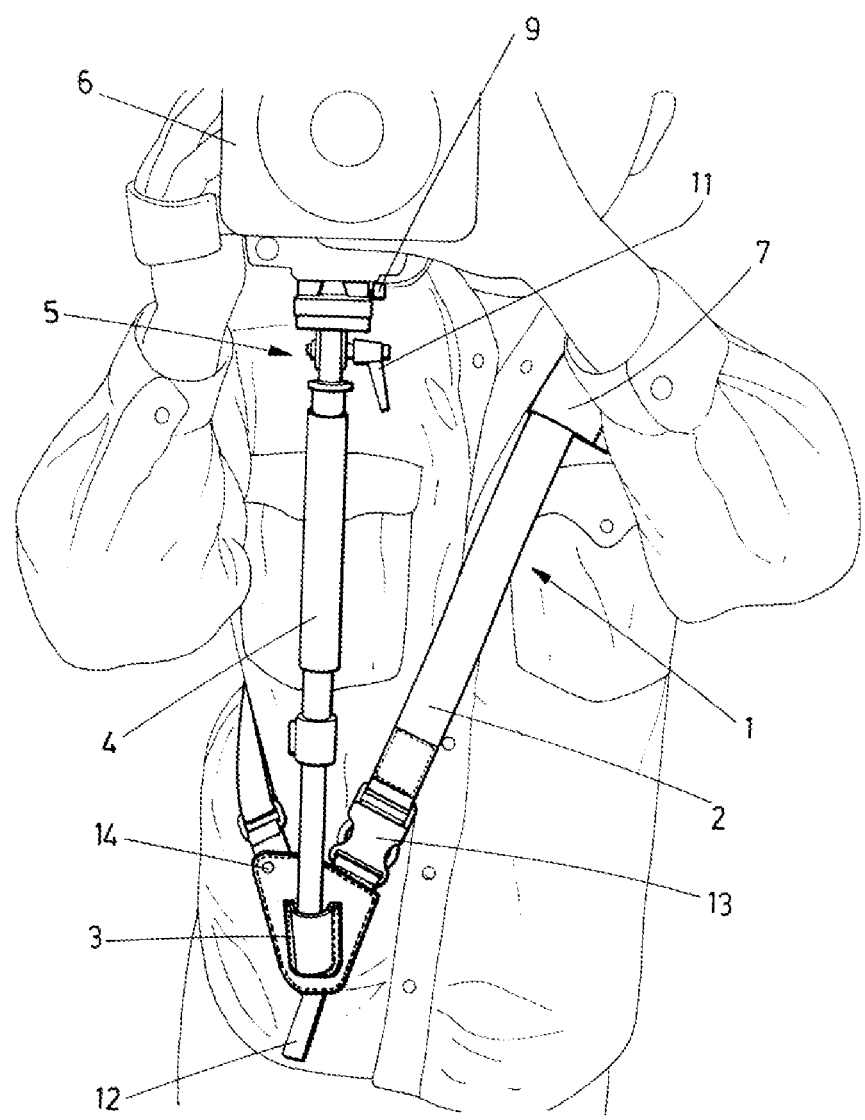
FIG. 1. Shows a front view wherein the camera operator can be observed using the device of the invention with a video camera.

As can be observed in FIG. 1, the video camera support device comprises a harness (1) formed by an elastic band (2) mounted around the camera operator's torso and back obliquely between the shoulder and side of the abdomen opposite said shoulder and by a receptacle sheath (3) that extends from the elastic band (2) and which appears disposed and oriented downwards in correspondence with said side of the abdomen.

Complementarily to the harness (1), the device includes a supporting foot (4) having a lower end which is housed in the receptacle sheath (3) and another upper end which is associated with a coupling mechanism (5) whereto the video camera (6) is coupled, which in turn appears resting on the shoulder of the operator opposite the shoulder around which the elastic band (2) is disposed.

The device thus conceived therefore enables the transfer of stress, which implies the distribution of the weight of the video camera (6) on the operator's two shoulders.

Figure 2:
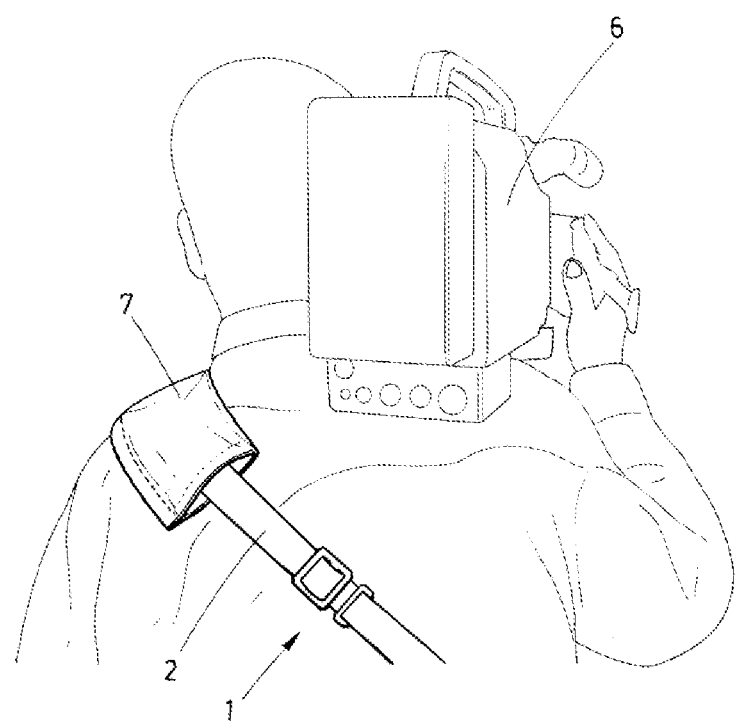
FIG. 2. Shows a rear view wherein the camera operator can be observed using the device of the invention with a video camera.

FIG. 2 shows how the elastic band (2) extends along the operator's back and the incorporation of a padded reinforcement (7) that leads to the elastic band (2) and which constitutes the contact surface of the device on the shoulder.

Figure 3:
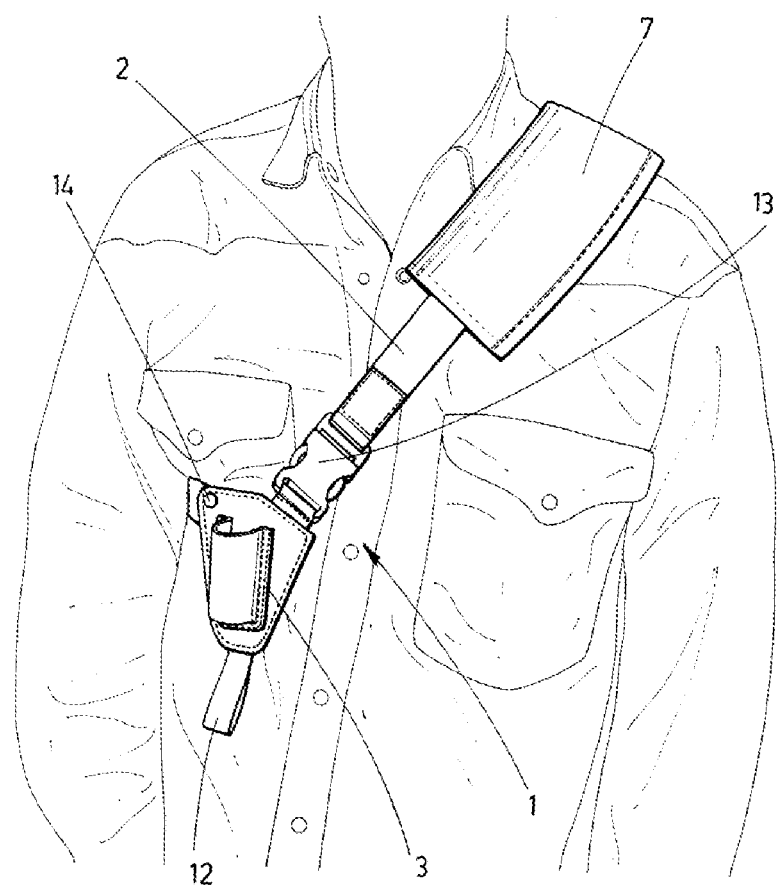
FIG. 3. Shows a front view of the operator wearing the harness.

FIG. 3 shows the harness (1) without the supporting foot (4), wherein it can be observed that the elastic band (2) is shorter than in the case of FIG. 1, wherein it appears extended as a consequence of the load transferred by the video camera (6) towards the receptacle sheath (3) and, therefore, to the elastic band (2) through the supporting foot (4).

Figure 4:
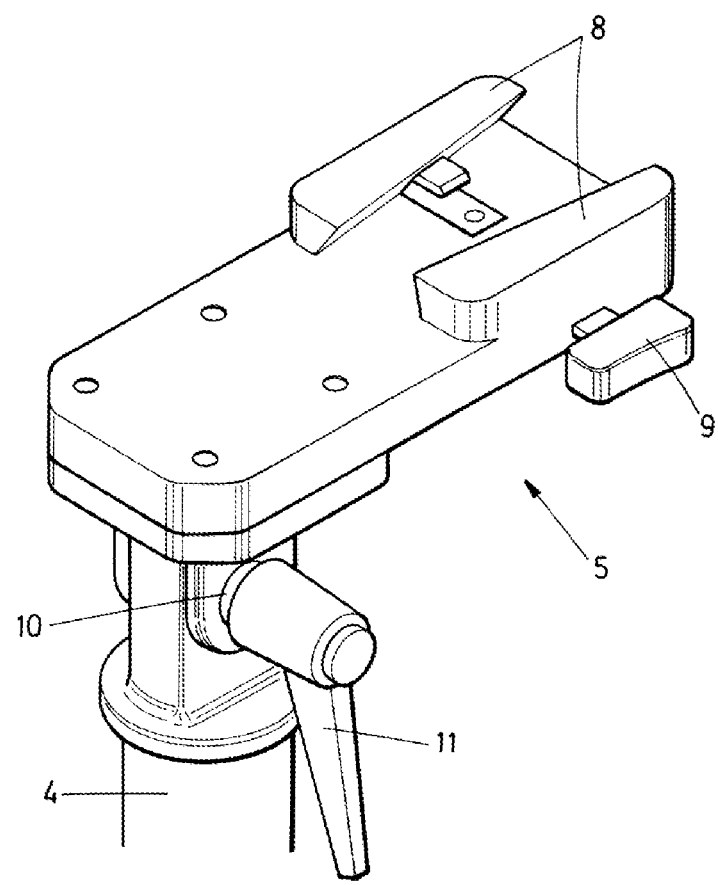
FIG. 4. Shows a perspective view of the anchoring mechanism mounted on the end of the supporting foot.

The coupling mechanism (5) represented in FIG. 4 comprises a guide (8) destined for fitting a support element of the video camera (6), a quick interlock element (9) which ensures the coupling of the video camera (6); likewise, it can be observed in this same FIG. 4 that the device incorporates a first articulation (10) between the coupling mechanism (5) and the upper end of the supporting foot (4) which allows the coupling mechanism (5) and the video camera (6) coupled thereto to swivel around said first articulation (10) with respect to the supporting foot (4).

Figure 5:
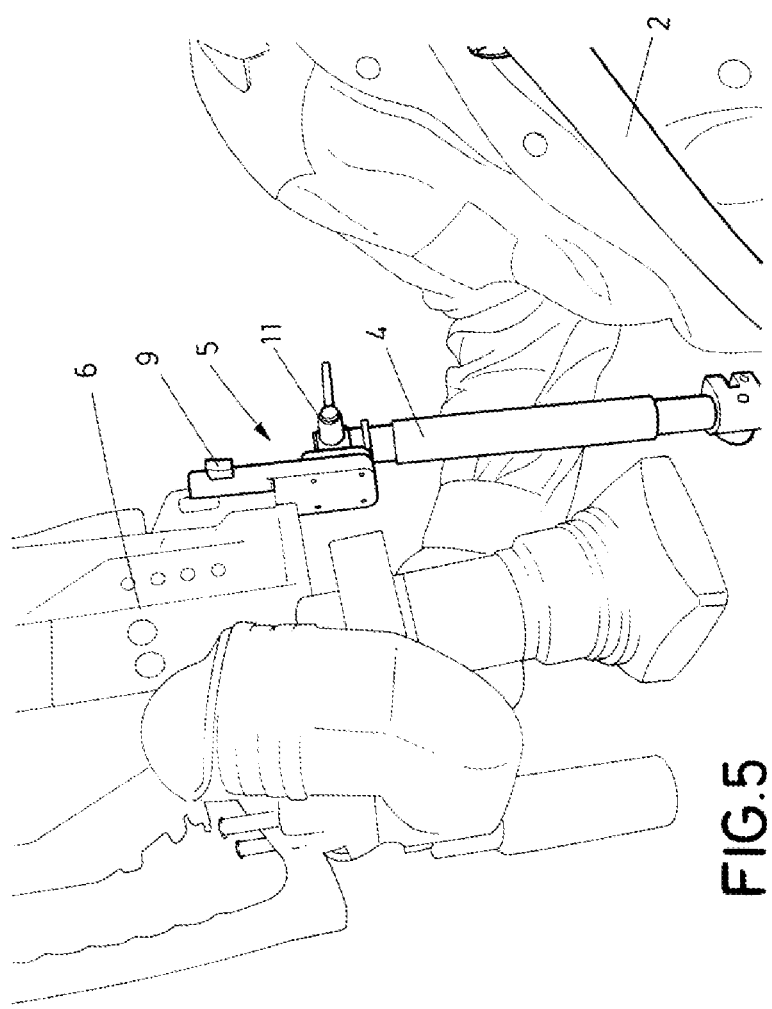
FIG. 5. Shows a side view wherein the operator can be observed orienting the camera downwards.
Figure 6:
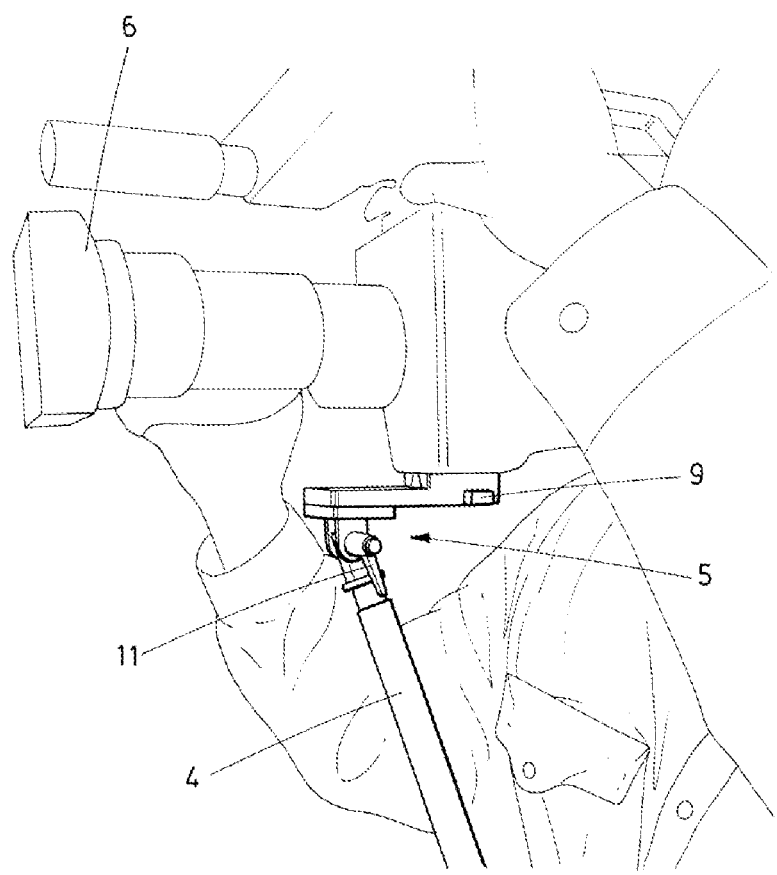
FIG. 6. Shows a side view wherein the operator can be observed shooting a low-angle shot.

FIG. 5 or 6 show two positions of the video camera (6) resulting from rotating it jointly with the coupling mechanism (5) from the position of FIG. 1 and with respect to the supporting foot (5) around the first articulation (10).

The first articulation (10) represented in FIG. 4 has an associated fixing element (11) which enables the fixation of the coupling mechanism (5) and, therefore, the video camera (6) with respect to the supporting foot (4), establishing a fixed position of the video camera (6).

In FIG. 3 it can also be observed that the harness (1) has a puller (12) disposed underneath the receptacle sheath (3) destined for facilitating the introduction of the hand or fingers to pull the elastic band downwards, facilitating the extension thereof for introducing the foot in the support (4).

Furthermore, FIG. 1 shows an interlocking mechanism (13) that establishes the closure of the band (2) around the operator in its assembly situation.

Likewise, in FIGS. 1 and 3 it has been envisaged that the harness (1) will incorporate a second articulation (14) between the elastic band (2) and the receptacle sheath (3) which enables the elastic band (2) to swivel around the receptacle sheath (3) to facilitate the positioning of the receptacle sheath (3) on the operator's torso and the distribution of forces on the elastic band (2).

The invention claimed is:

1. A video camera support device intended for distributing the weight of the video camera between shoulders of a camera operator, comprising:
    a harness formed by
        a band for mounting around a camera operator's torso and back obliquely between one shoulder of the camera operator and a side of the camera operator's abdomen opposite said shoulder; and
        a receptacle sheath that extends from the band,
    a supporting foot having:
        a lower end for being housed in the receptacle sheath, and
        an upper end,
        a coupling mechanism associated with the upper end of the supporting foot for coupling the video camera that transfers part of its weight through the supporting foot to the receptacle sheath and, in turn, to the band,
    wherein the band is an elastic band made of an elastic material which is able to extend from a shorter position to an extended position as a consequence of the load transferred by the video camera to the elastic band through the supporting foot towards the receptacle sheath, then causing tension and elongation of the elastic band.

2. The video camera support device of claim 1, wherein the shorter position of the elastic band corresponds to the position of the receptacle sheath in the proximity of an armpit height of the camera's operator, and the extended position of the elastic band corresponds to the position of the receptacle sheath in the proximity of a hip height of the camera's operator.

3. The video camera support device of claim 1, wherein the coupling mechanism comprises a guide for fitting a support element of the video camera and a quick interlock element that ensures the coupling of the video camera.

4. The video camera support device of claim 1 further comprising a first articulation between the coupling mechanism and the upper end of the supporting foot which enables the coupling mechanism and the video camera coupled thereto to swivel around said first articulation with respect to the supporting foot.

5. The video camera support device of claim 4 further comprising a fixing element associated with the first articulation, which makes it possible to fix the position of the coupling mechanism and, therefore, of the video camera with respect to the supporting foot.

6. The video camera support device of claim 1 further comprising a padded reinforcement that leads to the elastic band and which constitutes the contact surface of the device on the camera operator's shoulder.

7. The video camera support device of claim 1 wherein the harness incorporates a second articulation between the elastic band and the receptacle sheath, which allows the elastic band to swivel around the receptacle sheath.

8. The video camera support device of claim 1 wherein the harness has a puller disposed underneath the receptacle sheath destined for facilitating the introduction of the hand or fingers to pull the elastic band downwards, facilitating the extension thereof for introducing the supporting foot.

* * * * *

UNITED STATES PATENT AND TRADEMARK OFFICE
CERTIFICATE OF CORRECTION

PATENT NO.         : 10,088,099 B2
APPLICATION NO.    : 15/547447
DATED              : October 2, 2018
INVENTOR(S)        : Carrasco Brioso Page 1 of 1

It is certified that error appears in the above-identified patent and that said Letters Patent is hereby corrected as shown below:

On the Title Page

<u>Item (72) Inventors:</u>
Delete "Montes Cantos, San Juan de Aznalfarache (ES)"

Signed and Sealed this
Sixteenth Day of July, 2019

Andrei Iancu
*Director of the United States Patent and Trademark Office*